United States Patent
Koehn et al.

(10) Patent No.: US 8,431,234 B2
(45) Date of Patent: Apr. 30, 2013

(54) BIAXIALLY ORIENTED POLYPROPYLENE FILM WITH HEAT SEALABLE MATTE LAYER

(75) Inventors: Harold Egon Koehn, North Kingstown, RI (US); Tien-Kuei Su, Somerset, NJ (US)

(73) Assignee: Toray Plastics (America), Inc., North Kingstown, RI (US)

( * ) Notice: Subject to any disclaimer, the term of this patent is extended or adjusted under 35 U.S.C. 154(b) by 540 days.

(21) Appl. No.: 11/854,335

(22) Filed: Sep. 12, 2007

(65) Prior Publication Data

US 2008/0220226 A1 Sep. 11, 2008

Related U.S. Application Data

(60) Provisional application No. 60/843,709, filed on Sep. 12, 2006.

(51) Int. Cl.
*B32B 33/00* (2006.01)
*B32B 27/00* (2006.01)
*B29C 47/00* (2006.01)

(52) U.S. Cl.
USPC ............ 428/515; 428/200; 428/213; 428/516

(58) Field of Classification Search .................. 428/515, 428/516
See application file for complete search history.

(56) References Cited

U.S. PATENT DOCUMENTS

| | | | |
|---|---|---|---|
| 4,522,887 A | | 6/1985 | Koebisu et al. |
| 5,302,442 A | * | 4/1994 | O'Brien et al. ............... 428/213 |
| 5,474,820 A | * | 12/1995 | Murschall et al. ........... 428/35.7 |
| 5,494,717 A | * | 2/1996 | Peiffer et al. ................ 428/34.9 |
| 6,087,015 A | * | 7/2000 | Cretekos et al. .............. 428/447 |
| 6,534,153 B1 | * | 3/2003 | Chu et al. .................... 428/195.1 |
| 6,787,243 B2 | * | 9/2004 | Su et al. ........................ 428/461 |
| 6,849,313 B2 | * | 2/2005 | Mechelaere et al. ......... 428/35.2 |
| 8,021,759 B1 | * | 9/2011 | Ahlgren et al. ............... 428/515 |
| 2003/0148119 A1 | * | 8/2003 | Su et al. ........................ 428/457 |
| 2004/0081842 A1 | * | 4/2004 | Peet ............................. 428/515 |
| 2004/0241477 A1 | * | 12/2004 | Watanabe .................... 428/515 |
| 2005/0038192 A1 | * | 2/2005 | Janssens et al. .............. 525/191 |
| 2005/0137336 A1 | * | 6/2005 | Su et al. ........................ 525/191 |
| 2006/0047073 A1 | * | 3/2006 | Inoue .......................... 525/191 |
| 2008/0057313 A1 | * | 3/2008 | Bicakci-Jenkins et al. ... 428/413 |

FOREIGN PATENT DOCUMENTS

| | | |
|---|---|---|
| EP | 0 538 746 | 4/1993 |
| EP | 0 538 747 | 4/1993 |
| EP | 0 622 186 | 11/1994 |
| EP | 0 622 187 | 11/1994 |
| EP | 1 268 202 | 1/2003 |

OTHER PUBLICATIONS

Abstract and Machine Translation of JP2004099909, Apr. 2004, Hashimoto et al.*
http://iisrp.com/WebPolymers/05ModPolyolefinElast_v1-2.pdf (1999).*
English abstract of JP 2003-072001, Mar. 2003, Watanabe et al.*

* cited by examiner

*Primary Examiner* — Alicia Chevalier
*Assistant Examiner* — Ronak Patel
(74) *Attorney, Agent, or Firm* — Morrison & Foerster LLP

(57) ABSTRACT

A laminate film including a first polyolefin heat sealable matte resin layer including a blend of 15-30 wt % metallocene-catalyzed butene-propylene elastomer and 85-70 wt % of a matte resin including ethylene homopolymer and propylene homopolymer or copolymer is disclosed. The laminate film could further have additional layers such as a second polyolefin resin-containing layer, a metal layer, or combinations thereof.

16 Claims, 1 Drawing Sheet

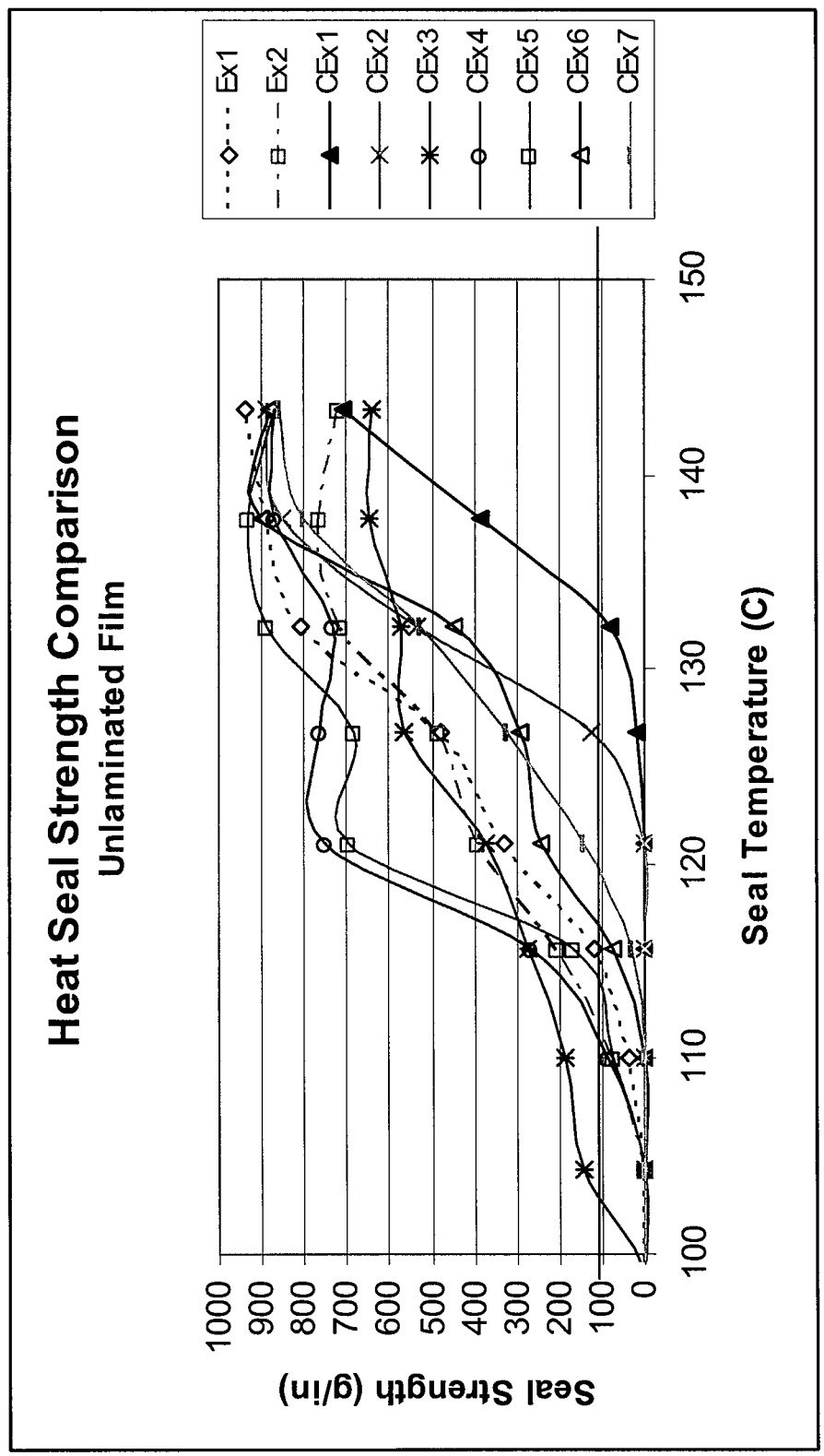

BIAXIALLY ORIENTED POLYPROPYLENE FILM WITH HEAT SEALABLE MATTE LAYER

CROSS REFERENCE TO RELATED APPLICATION

This application claims the benefit of U.S. Provisional Application Ser. No. 60/843,709, filed Sep. 12, 2006.

FIELD OF INVENTION

The present disclosure relates to a multi-layer biaxially oriented polypropylene (BOPP) film with a novel matte skin layer which also exhibits excellent sealability. This sealable matte skin layer is a formulation of matte resins blended with an amount of propylene-butene metallocene elastomer. Such a matte layer formulation results in excellent matte appearance and good heat sealable properties.

BACKGROUND OF INVENTION

Biaxially oriented polypropylene (BOPP) films used for packaging, decorative, and label applications often perform multiple functions. For example, they may perform in a lamination to provide printability, transparent or matte appearance, or slip properties. Further, they sometimes may provide a heat sealable layer for bag forming and sealing, or a layer that is suitable for receiving an adhesive either by coating or laminating.

For matte BOPP films, it is often desirable for the matte layer to have a certain low gloss level and a hazy appearance. The level of matte appearance is an aesthetic consideration and can be achieved by mixing two incompatible polymers. In most cases, this can be a blend of ethylene homopolymer (either low density polyethylene, medium density polyethylene, or high density polyethylene) with a propylene homopolymer or copolymers (e.g. propylene-ethylene copolymer, propylene-ethylene-butene copolymers, etc.). The degree of matte appearance can be controlled by the amount of polyethylene blended with the propylene homopolymer or copolymer.

EP Patent 0538747 B1 describes the formulation of a matte resin blend using HDPE and a copolymer of ethylene-propylene, ethylene-butylene, propylene-butylene, or ethylene-propylene-butylene in a weight ratio of 20-80% HDPE. A sealable matte resin formulation is produced by combining a specific blend of HDPE and ethylene, butene, or propylene co- or terpolymers. A large amount of co- or terpolymer is required to achieve heat sealability (40-55 wt %). However, no or little sealability can occur if the matte resin is formed from HDPE (or LDPE, MDPE) and a propylene homopolymer. In addition, if the amount of propylene co- or terpolymer is too high in order to achieve sealability, matte appearance is diminished.

EP Patent 0622186 B1 describes the formulation of a sealable and shrinkable matte BOPP film using a matte resin blend of HDPE and blends of ethylene, butene, or propylene co- or terpolymers in a weight ratio of 20-80% HDPE. The film exhibits specific machine and transverse direction shrinkage values which are relatively high for a BOPP film at specified temperatures and thus, may be unsuitable for non- or low-shrinkage thermally stable BOPP applications. However, no or little sealability can occur if the matte resin is formed from a HDPE (or LDPE, MDPE) and a propylene homopolymer. Moreover, if the amount of propylene co- or terpolymer is too high in order to achieve sealability, matte appearance is diminished.

U.S. Pat. No. 4,522,887 describes a matte film formulation using a matte resin blend of ethylene-propylene block copolymer of at least 3 melting peaks within the range of 120° C. to 165° C. and including 10-50 wt % ethylene. HDPE or other ethylene homopolmers blended with propylene copolymer or homopolymer are not used to impart matte appearance. The patent is silent with respect to heat sealable properties of the invention, but generally speaking, block copolymers will have a higher seal initiation temperature and thus, a narrower seal range, than respective random copolymers.

EP Patent 1268202 B1 describes a matte film formulation using a matte resin blend formulation of 30-80 wt % high molecular weight HDPE and an incompatible polyolefin such as ethylene-propylene copolymer, ethylene-propylene-butene terpolymer, or propylene homopolymer. Some of the examples in this patent exhibited heat sealability but only at 116° C. or higher, which limits the utility of such heat sealability in high-speed sealing applications.

EP Patent 0538746 B1 describes a matte film formulation using a matte resin formulation of 20-80 wt % HDPE and propylene homopolymer. The film has a high haze of >40% and is not heat sealable.

EP Patent 0622187 B1 describes a matte film formulation using a matte resin formulation of propylene homopolymer or ethylene, propylene, or butene copolymers with HDPE further blended with propylene homopolymer or ethylene, propylene, or butene copolymers. The film is also highly shrinkable at specified temperatures. However, no or little sealability may occur if the matte resin is formed from HDPE (or LDPE, MDPE) and a propylene homopolymer. In addition, if the amount of propylene co- or terpolymer is too high in order to achieve sealability, matte appearance is diminished.

SUMMARY OF THE INVENTION

Described is a matte resin that balances attributes of matte appearance and heat sealability. This matte resin can be formed by adding an amount from 15-30 wt % of low molecular weight, amorphous, metallocene-catalyzed propylene-butene elastomer of 20-40 wt % butene content. The matte resin need not include blends of ethylene/propylene/butene copolymers and terpolymers with ethylene homopolymer but can include a blend of ethylene homopolymer and propylene homopolymer or copolymer commercially available by various manufacturers.

One embodiment is a laminate film including a first layer of a matte resin including a propylene homopolymer or ethylene-propylene copolymer and high density polyethylene blended with an amount of metallocene-catalyzed propylene-butene (PB) elastomer. The laminate could further include a second polyolefin resin-containing layer on one side of said matte sealable layer. This second polyolefin resin-containing layer could be considered a core or base layer to provide the bulk strength of the laminate film. Furthermore, the laminate could further include a third polyolefin resin-containing layer on the second polyolefin resin-containing core layer opposite the side with the matte sealable layer. The first matte sealable layer of this laminate may include either a blend of propylene homopolymer or an ethylene-propylene copolymer with an amount of high density polyethylene to impart the matte appearance. This blend can then be combined with an amount of metallocene-catalyzed propylene-butene elastomer that provides excellent heat sealable properties while maintaining adequate matte appearance.

Preferably, the second polyolefin resin-containing layer includes a propylene homopolymer or propylene-ethylene copolymer. More preferable is an isotactic propylene homopolymer or a mini-random ethylene-propylene copolymer to act as the core or base layer of the laminate film. If increased stiffness is desired for this film, a high crystalline content isotactic propylene homopolymer may be employed, such as one with a $C^{13}$ NMR isotactic pentad index of 95% or more. This core polyolefin resin-containing layer can also include an antiblock component selected from the group consisting of amorphous silicas, aluminosilicates, sodium calcium aluminum silicates, crosslinked silicone polymers, and polymethylmethacrylates to aid in machinability and winding. Further stiffness can be obtained by incorporating into the core polyolefin layer modifiers or additives such as hydrocarbon resins or fine mineral fillers that do not substantially affect the overall matte appearance or transparency of the laminate structure.

Preferably, the third polyolefin resin-containing layer includes a polyolefin selected from the group consisting of propylene homopolymer, copolymers, terpolymers, polyethylene and combinations thereof. This third polyolefin resin-containing layer can also include an antiblock component selected from the group consisting of amorphous silicas, aluminosilicates, sodium calcium aluminum silicates, crosslinked silicone polymers, and polymethylmethacrylates to aid in machinability and winding. Preferably, the third polyolefin layer is a discharge-treated layer having a surface for lamination, metallizing, printing, or coating with adhesives or inks.

In the case of a film structure including only one layer, such as said matte sealable layer, it is preferable to discharge-treat one side of this layer for lamination, metallizing, printing, or coating, while leaving the opposite side untreated in order to maintain heat sealable properties. Discharge-treating this layer can result in the treated side having a narrower seal range due to crosslinking of the ethylene and butene constituents of the blend. Thus, at least one side may be left untreated in order to obtain the full and useful heat seal range. In the case of a 2-layer laminate structure wherein the matte sealable layer is contiguous with a polyolefin core layer, it is preferable to discharge-treat the side of the core layer opposite the matte sealable layer for purposes of laminating, printing, metallizing, coating, etc.

One embodiment is a single layer thermally stable film including a heat sealable matte resin layer. The heat sealable matter resin layer includes 15 to 30 wt % of a metallocene-catalyzed propylene-butene copolymer elastomer and 70 to 85% of a blend of propylene homopolymer or 70 to 85% of a blend of ethylene homopolymer and high density polyethylene.

Discharge-treatment in the above embodiments can be accomplished by several means, including but not limited to corona, flame, plasma, or corona in a controlled atmosphere of selected gases. In one variation, the discharge-treated surface may be a corona discharge-treated surface formed in an atmosphere of $CO_2$ and $N_2$ to the exclusion of $O_2$. The laminate film embodiments could further include a vacuum-deposited metal layer on the discharge-treated layer's surface. The metal layer may have a thickness of about 5 to 100 nm, have an optical density of about 1.5 to 5.0, and include aluminum. In one variation, the laminate film is an extruded laminate film.

In yet another embodiment, this invention provides biaxially oriented polyolefin multi-layer films with a matte skin layer of blends of propylene polymers and HDPE with metallocene PB elastomer to enhance heat sealing properties for flexible packaging purposes. An additional embodiment provides laminate structures of matte polyolefin layers and PB metallocene elastomer blend layers for heat sealable applications in flexible packaging.

Preferably, the laminate film is produced via coextrusion of the matte sealable layer blend and the core layer and/or other layers through a compositing die whereupon the molten multilayer film structure is quenched upon a chilled casting roll system or casting roll and water bath system and subsequently oriented in the machine and/or transverse direction into a multi-layer film.

All these examples can also be metallized via vapor-deposition, preferably a vapor-deposited aluminum layer, with an optical density of at least about 1.5, preferably with an optical density of about 2.0 to 4.0, and even more preferably between 2.3 and 3.2. Optionally, an additional layer specifically formulated for metallizing to provide adequate metal adhesion, metal gloss, and gas barrier properties can be disposed on the second polyolefin resin-containing core substrate layer, opposite the side with the matte sealable blend layer. This additional layer's surface may also be modified with a discharge treatment to make it suitable for metallizing, laminating, printing, or converter applied adhesives or other coatings.

BRIEF DESCRIPTION OF THE DRAWINGS

FIG. 1 is a graph comparing the heat seal strength of the Examples and Comparative Examples.

DETAILED DESCRIPTION OF THE INVENTION

There are several commercial resins available in the marketplace for matte resins. However, in most cases, these commercially available matte resins do not exhibit satisfactory heat sealability properties; at best, under typical heat sealing conditions, a light "tack" is all that can be achieved which may be easily pulled apart by hand. If such matte resins are blended with typical heat sealable resins such as propylene copolymers or terpolymers, it is found that in order to achieve adequate heat seal properties, the degree of acceptable matte appearance is lost due to either dilution of the incompatible polymer or due to some compatibilizing effect that the copolymer has with the incompatible polyethylene to the polypropylene.

It has been found that by blending commercially available matte resins with an amount of propylene-butene metallocene elastomer of a certain butene content, that excellent heat sealability properties can be obtained without sacrificing matte appearance.

In one embodiment, the laminate film includes a 2-layer coextruded film. The film includes a mixed polyolefin resin layer including a matte resin blend of propylene homopolymer or an ethylene-propylene copolymer and HDPE mixed with an amount of an amorphous metallocene-catalyzed propylene-butene elastomer. An isotactic propylene homopolymer core layer can be disposed on one side of the mixed resin layer. The side of the isotactic propylene homopolymer core layer opposite the matte resin blend may be discharge-treated.

Another embodiment includes a similar construction as above, except that the core polyolefin resin layer includes a high crystalline propylene homopolymer resin blended with an amount of a hydrocarbon resin.

The polypropylene resin core layer may be a crystalline polypropylene of specific isotactic content and can be uniaxially or biaxially oriented. The crystalline polypropylene can be a propylene homopolymer or a mini-random ethylene-propylene copolymer with a fractional ethylene content of less than 1 wt % of the polymer (preferably about 0.5-0.6 wt %). Crystalline polypropylenes are generally described as having an isotactic content of about 90% or greater. Suitable examples of crystalline polypropylenes include TOTAL 3271 and ExxonMobil PP4772. These resins also have melt flow rates of about 1.6 g/10 min, a melting point of about 157.3° C., a crystallization temperature of about 108-126° C., a heat of fusion of about 98.2 J/g, a heat of crystallization of about 105-111 J/g, a $C^{13}$ NMR isotactic pentad ratio of about 93%, a % heptane insolubles of about 95-96%, and a density of about 0.90-0.91.

The core resin layer is typically 15 μm to 100 μm in thickness after biaxial orientation, preferably between 10 μm and 50 μm, and more preferably between 20 μm and 40 μm in thickness. A preferred embodiment is to use high crystalline propylene homopolymer such as Total 3270 to provide a higher modulus film and consequently, a stiffer film. This resin typically has an isotactic index of greater than 95%, preferably 98%, as measured by $C^{13}$ NMR isotactic pentad ratio, and % heptane insolubles of 97% or greater, melt flow rate of nominal 2.0 g/10 minutes at 230° C., melting point of 163-167° C., a crystallization temperature of about 108-126° C., a heat of fusion of about 86-110 J/g, a heat of crystallization of about 105-111 J/g, and a density of about 0.91.

The core layer can also include an amount of hydrocarbon resin additive to further improve stiffness and provide some moisture barrier improvement. A preferred embodiment combines an amount of the hydrocarbon resin with a high crystalline propylene homopolymer, to produce a satisfactorily stiff BOPP film that has a roughly 10% higher modulus and stiffness than an equivalent film made with a conventional crystallinity propylene homopolymer alone. The hydrocarbon resin also acts as a processing aid during biaxial orientation of the film by allowing a wider processing window in terms of stretching temperatures and motor torques for machine direction (MD) and particularly, transverse direction (TD) stretching, particularly when using a high crystalline propylene homopolymer. A suitable hydrocarbon resin is of the polydicyclopentadiene type available in masterbatch form from ExxonMobil as PA609A or PA610A, which are 50 wt % masterbatches of polypropylene carrier resin and 50 wt % polydicyclopentadiene. Suitable amounts of hydrocarbon masterbatch may include concentrations of up to 20 wt % of the core layer (i.e. up to 10 wt % active hydrocarbon resin component). Preferably, 20 wt % of the hydrocarbon resin masterbatch is used in conjunction with the high crystalline propylene homopolymer.

The core resin layer can be surface treated on one side with either an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating.

In this embodiment of a 2-layer laminate film, it is often desirable to add an optional amount of antiblocking agent to the core layer for aiding machinability and winding. An amount of an inorganic antiblock agent can be added in the amount of 100-1000 ppm of the core resin layer, preferably 300-600 ppm. Preferred types of antiblock are spherical sodium aluminum calcium silicates or an amorphous silica of nominal 6 μm average particle diameter, but other suitable spherical inorganic antiblocks can be used including crosslinked silicone polymer or polymethylmethacrylate, and ranging in size from 2 μm to 6 μm. Migratory slip agents such as fatty amides and/or silicone oils can also be optionally employed in the core layer either with or without the inorganic antiblocking additives to aid further with controlling coefficient of friction and web handling issues. Suitable types of fatty amides are those such as stearamide or erucamide and similar types, in amounts of 100-1000 ppm of the core. Preferably, stearamide is used at 400-600 ppm of the core layer. A suitable silicone oil that can be used is a low molecular weight oil of 350 centistokes which blooms to the surface readily at a loading of 400-600 ppm of the core layer. However, if the matte films are to be used for metallizing or high definition process printing, migratory slip additives may be avoided in order to maintain metallized barrier properties and adhesion or to maintain high printing quality in terms of ink adhesion and reduced ink dot gain.

The sealable matte resin layer may include a blend of a matte resin and an amount of metallocene-catalyzed propylene-butene elastomer. The matte resin can be of any number of commercially available matte resins which are typically blends of propylene homopolymer or ethylene-propylene random or block copolymers with ethylene homopolymer, preferably high density polyethylene. Suitable matte resins are those available from Sun Allomer such as grade PC603A, a blend of propylene homopolymer and HDPE in a % weight ratio of 70:30, respectively. This matte resin grade is a nominal 7.0 g/10 min melt flow rate at 230° C., nominal bimodal melting points at 134° C. (HDPE) and 163° C. (PP), nominal density 0.9 g/cm$^3$, and uses a propylene homopolyer of nominal 1.5 g/10 min melt flow rate, and a high density polyethylene of 0.952-0.955 g/cm$^3$ and 0.4-0.5 g/10 min melt index at 190° C. Another suitable grade from Sun Allomer is PC523A, which is a blend of ethylene-propylene random copolymer and low density polyethylene in a % weight ratio of 70:30, respectively, and having a nominal melt flow rate of 5.0 g/10 min at 230° C., nominal melting point of 148° C., and nominal density of 0.9 g/cm$^3$. Yet another suitable grade of matte resin is from Grand Polymer Co., Ltd., called F215V, which is a blend of ethylene-propylene block copolymer (EPC) of nominal 3 wt % ethylene content and high density polyethylene in a % weight ratio of 80:20, respectively. F215V matte resin has a nominal melt flow rate of 4.7 g/10 min at 230° C., with the EP block copolymer melt flow rate at nominal 8.35 g/10 min at 230° C. and the HDPE at a nominal melt index of 0.5 g/10 min at 190° C. The above matte resins typically provide a suitably matte BOPP film appearance with high haze, low gloss, and controlled coefficient of friction via a roughened surface due to the incompatibility between the propylene-based polyolefin and the ethylene homopolymer. An optional amount of an inorganic antiblock agent can also be added to this layer, for example, in the amount of 100-5000 ppm of the matte resin layer. Preferred types of antiblock are spherical sodium aluminum calcium silicates of nominal 3 μm in diameter, but other suitable spherical inorganic antiblocks can be used including crosslinked silicone polymer, polymethylmethacrylate, silicas, and silicates, and ranging in size from 2 μm to 6 μm. Migratory slip agents such as fatty amides or silicone oils can also be optionally added to the matte resin layer of types and quantities mentioned previously if lower COF is desired. However, if the matte films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

The metallocene-catalyzed propylene-butene elastomer is blended with the suitable matte resin in an amount of 10-40 wt % of the matte skin layer, preferably 15-30 wt %, and even more preferably 20-25 wt %. This ratio of elastomer and matte resin results in a good balance of matte appearance with low gloss/high haze and heat sealable characteristics. The metallocene-catalyzed propylene-butene random elastomer preferably has 20-40 wt % butene content of the elastomer and the resulting polymer is amorphous or of low crystallinity, and is of very low density compared to typical polyethylenes. The metallocene catalysis of such elastomers results in a narrow molecular weight distribution; typically, $M_w/M_n$ is 2.0 polydispersity. Comonomer dispersion is also narrower than in a comparable Ziegler-Natta catalyzed elastomer. This, in turn, results in an elastomer which provides lower seal initiation temperature and maintains high seal strength when used as a heat sealant modifier.

Suitable metallocene-catalyzed propylene-butene elastomer materials are such as those manufactured by Mitsui Chemicals under the tradename TAFMER® and grade names XM7070 and XM7080. These are propylene-butene low molecular weight, low crystallinity copolymers. XM7070 is about 26 wt % butene content; XM7080 is about 22 wt % butene. They are characterized by a melting point of 75° C. and 83° C., respectively; a Vicat softening point of 67° C. and 74° C., respectively; a density of 0.883-0.885 g/cm³; a $T_g$ of about −15° C.; a melt flow rate at 230° C. of 7.0 g/10 minutes; and a molecular weight of 190,000-192,000 g/mol. XM7070 is preferred due to its higher butene content. The metallocene propylene-butene elastomers are in contrast to typical ethylene-propylene or propylene-butene or ethylene-propylene-butene copolymers used for heat sealant resin layers in coextruded BOPP films such as SUMITOMO SPX78H8 which are long-chain, high molecular weight polymers with significantly higher molecular weights on the order of 350,000 to 400,000 g/mol.

The metallocene propylene-butene elastomers are also in contrast to non-metallocene Ziegler-Natta catalyzed propylene-butene elastomers such as MITSUI TAFMER® XR110T. XR110T has a butene content of about 25.6 wt % and molecular weight of about 190,185 g/mol which is similar to XM7070, but its density of 0.89 g/cm³, melting point of 110° C., and Vicat softening point of 83° C. are all higher than its metallocene-catalyzed counterpart XM7070 butene-propylene elastomer. Additionally, due to the Ziegler catalyst system, the molecular weight distribution of the non-metallocene catalyzed butene-propylene elastomer XR110T is much wider than the metallocene-catalyzed butene-propylene elastomer XM7070. Consequently, the properties and heat sealable properties of a non-metallocene-catalyzed butene-propylene elastomer is much different from a metallocene-catalyzed butene-propylene elastomer.

The sealable matte resin blend layer can be coextruded on one side of the core layer. The matte layer may have a thickness after biaxial orientation of between 0.1 and 5 µm, preferably between 0.5 and 3 µm, and more preferably between 1.0 and 2.0 µm. The core layer thickness can be of any desired thickness after biaxial orientation, but preferred and useful thicknesses are in the range of 15 µm to 100 µm, preferably 18 µm to 50 µm, and even more preferably 22.5 µm-32.5 µm. The coextrusion process includes a multi-layered compositing die, such as a two-, three-, or four-layer die. In the case of a 2-layer coextruded film, a two-layer compositing die can be used. In the case of a 3-layer coextruded film, the polymer core layer can be sandwiched between the sealable matte resin blend layer and a third layer using a three-layer compositing die. One embodiment is to coextrude in only two layers with only the core layer and the sealable matte/elastomer blend layer coextruded on one side of the core layer. In this case, the core layer side opposite the sealable matte resin blend layer can be further modified by adding inorganic antiblock particles into the core layer itself and can also be surface-treated via a discharge-treatment method if so desired. In a three-layer coextruded film embodiment, this third layer on the side of the core layer opposite the sealable matte blend layer can also be modified with antiblock particles in lieu of the core layer and also be surface-treated via a discharge-treatment method as desired. The third layer may be any polymer typically compatible with the core layer resin such as propylene homopolymer or copolymers with ethylene and/or butene, polyethylene, or blends thereof. Typically, selection of this third layer is to enhance the coextruded film's printability, appearance, metallizability, winding, laminating, sealability, or other useful characteristics. Useful thickness of this third layer after biaxial orientation can be similar to the thicknesses cited for the sealable matte skin layer.

The surface opposite the sealable matte resin blend layer can be surface-treated if desired with either a corona-discharge method, flame treatment, atmospheric plasma, or corona discharge in a controlled atmosphere of nitrogen, carbon dioxide, or a mixture thereof which excludes oxygen. The latter treatment method in a mixture of $CO_2$ and $N_2$ is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized.

If a three-layer coextruded film embodiment is chosen, the third layer may be coextruded with the core layer opposite the sealable matte resin blend layer. This layer may have a thickness after biaxial orientation between 0.5 and 5 µm, preferably between 0.5 and 3 µm, and more preferably between 1.0 and 2.0 µm. This third layer may contain an anti-blocking agent and/or slip additives for good machinability and a low coefficient of friction in about 0.05-0.5 wt % by weight of the third layer. Preferably, non-migratory slip and antiblock additives may be used to maintain gas barrier properties and metal adhesion if metallizing, or ink wetting and ink adhesion if printing.

The multilayer coextruded laminate sheet is cast onto a cooling drum whose surface temperature is controlled between 20° C. and 60° C. to solidify the non-oriented laminate sheet. The non-oriented laminate sheet is stretched in the longitudinal direction at about 135° C. to 165° C. at a stretching ratio of about 4 to about 6 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat-set or annealed to reduce internal stresses due to the orientation and minimize shrinkage and give a relatively thermally stable biaxially oriented sheet. The biaxially oriented film may have a total thickness between 15 and 100 µm, preferably between 20 and 40 µm, and most preferably between 25 and 35 µm.

Embodiments may include metallizing the discharge-treated surface opposite the sealable matte resin blend layer. The unmetallized laminate sheet is first wound in a roll. The roll is placed in a metallizing chamber and the metal vapor-deposited on the discharge-treated mixed resin metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer may have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture gas permeability, optical density, metal adhesion, metal appearance and gloss, and can be made into an adhesive laminate structure.

This invention will be better understood with reference to the following examples, which are intended to illustrate specific embodiments within the overall scope of the invention.

Example 1

A 2-layer coextrusion article including a core layer of a polypropylene resin using ExxonMobil PP4772 upon which one side was coextruded a mixed resin sealable matte layer of 20 wt % (of the mixed resin layer) metallocene-catalyzed propylene-butene elastomer—Mitsui XM7070 grade and 80 wt % Sun Allomer PC523A matte resin, as described in the above description. The metallocene PB elastomer was dry-blended with the matte resin. The total thickness of this film substrate after biaxial orientation was ca. 120G or 1.2 mil (30 μm). The thickness of the respective mixed sealable matte resin layer after biaxial orientation was ca. 8G (2 μm). The thickness of the core layer after biaxial orientation was ca. 112G (28 μm). The mixed sealable matte resin layer and core layer were melt co-extruded together at nominal 450-500° F. (230-260° C.). The 2-layer co-extrudate was passed through a flat die to be cast on a chill drum of 100-180° F. (38-82° C.). The formed cast sheet was passed through a series of heated rolls at 210-270° F. (99-132° C.) with differential speeds to stretch in the machine direction (MD) at ca. 5× stretch ratio. This was followed by transverse direction (TD) stretching at ca. 8× stretch ratio in the tenter oven at 310-350° F. (154-177° C.) and heat-set or annealed to reduce film shrinkage effects at ca. 304-343° F. (151-173° C.). The resultant biaxially oriented matte film was subsequently discharge-treated on the core layer's surface opposite said sealable matte resin layer via corona treatment to a dyne level of ca. 38-40 dyne/cm. The film was then wound up in roll form. The sealable matte film was tested for matte appearance, haze, gloss, and heat sealability.

Example 2

A process similar to Example 1 was repeated except that the mixed matte resin layer included a blend of 25 wt % Mitsui XM7070 and 75 wt % Sun Allomer PC523A. The matte film was tested for haze, gloss, and heat sealability.

Comparative Example 1

A process similar to Example 1 was repeated except that the mixed matte resin layer included 100 wt % of Sun Allomer PC523A matte resin. The matte film was tested for haze, gloss, and heat sealability.

Comparative Example 2

A process similar to Example 1 was repeated except that the mixed matte resin layer included a blend of 80 wt % Sun Allomer PC523A matte resin and 20 wt % of a metallocene-catalyzed ethylene-octene elastomer ExxonMobil EXACT™ 4150 of nominal 3.5 g/10 minutes melt index at 190° C., with a density of 0.895 g/cm$^3$, and peak melting point of 89.0° C. The matte film was tested for haze, gloss, and heat sealability.

Comparative Example 3

A process similar to Example 1 was repeated except that the mixed matte resin layer included 60 wt % of Sun Allomer PC523A matte resin and 40 wt % of Mitsui XM7070 metallocene propylene-butene elastomer. The matte film was tested for haze, gloss, and heat sealability.

Comparative Example 4

A process similar to Example 1 was repeated except that the mixed matte resin layer included 30 wt % Sun Allomer PC523A and 70 wt % Sumitomo SPX78H8 ethylene-propylene-butene copolymer of nominal 9.5 g/10 min melt flow rate at 230° C., and of nominal 1 wt % ethylene and 15 wt % butene content. The matte film was tested for haze, gloss, and heat sealability.

Comparative Example 5

A process similar to Example 1 was repeated except that the mixed matte resin layer included 50 wt % Sun Allomer PC523A and 50 wt % Sumitomo SPX78H8. The matte film was tested for haze, gloss, and heat sealability.

Comparative Example 6

A process similar to Example 1 was repeated except that the mixed matte resin layer included 70 wt % Sun Allomer PC523A and 30 wt % Sumitomo SPX78H8. The matte film was tested for haze, gloss, and heat sealability.

Comparative Example 7

A process similar to Example 1 was repeated except that the mixed matte resin layer included 75 wt % Sun Allomer PC523A and 25 wt % Mitsui TAFMER® XR110T non-metallocene-catalyzed (Ziegler-Natta catalyzed) butene-propylene elastomer of nominal 6 g/10 in melt flow rate at 230° C., melting point of 110° C., Vicat softening point of 83° C., density of 0.89 g/cm$^3$. The matte film was tested for haze, gloss, and heat sealability.

The unlaminated properties of the Examples and Comparative Examples ("CEx.") are shown in Table 1 and FIG. 1.

TABLE 1

| Sample | Matte Resin Layer Composition wt % | | | | | Gloss Matte side | Gloss Non-matte side | Haze % single sheet | Heat Seal Strength @ 115° C. (g/in) |
|---|---|---|---|---|---|---|---|---|---|
| | PC523A | XM7070 | SPX78H8 | 4150 | XR110T | | | | |
| Ex. 1 | 80 | 20 | 0 | 0 | 0 | 14.5 | 81.6 | 64.3 | 117 |
| Ex. 2 | 75 | 25 | 0 | 0 | 0 | 14.6 | 76.8 | 60.4 | 203 |

TABLE 1-continued

| Sample | Matte Resin Layer Composition wt % | | | | | Gloss Matte side | Gloss Non-matte side | Haze % single sheet | Heat Seal Strength @ 115° C. (g/in) |
| --- | --- | --- | --- | --- | --- | --- | --- | --- | --- |
| | PC523A | XM7070 | SPX78H8 | 4150 | XR110T | | | | |
| CEx. 1 | 100 | 0 | 0 | 0 | 0 | 14.2 | 84.0 | 67.3 | 0 |
| CEx. 2 | 80 | 0 | 0 | 20 | 0 | 19.8 | 85.7 | 39.7 | 0 |
| CEx. 3 | 60 | 40 | 0 | 0 | 0 | 18.8 | 77.7 | 37.1 | 274 |
| CEx. 4 | 30 | 0 | 70 | 0 | 0 | 32.4 | 83.0 | 21.0 | 270 |
| CEx. 5 | 50 | 0 | 50 | 0 | 0 | 15.4 | 82.5 | 49.0 | 168 |
| CEx. 6 | 70 | 0 | 30 | 0 | 0 | 14.2 | 85.0 | 66.8 | 74 |
| CEx. 7 | 75 | 0 | 0 | 0 | 25 | 14.6 | 77.2 | 59.8 | 28 |

As Table 1 shows, Comparative Example 1 (CEx. 1), which is the control film using the SunAllomer PC523A matte resin at 100 wt %, exhibited excellent matte appearance with low gloss of 14.2 on the matte side and high haze of 67.3%. However, CEx. 1 showed virtually no heat seal property at 115° C. (ca. 240° F.). Indeed, FIG. 1 shows this example to have the highest seal initiation temperature (SIT), failing to achieve a minimum 100 g/in heat seal strength until ca. 133° C. seal temperature on a sealing machine. In general, heat seal initiation of 115° C. or lower to achieve at least 100 g/in was desired, with a matte side gloss of less than 15, and a single sheet haze of 60% or more also desired.

In contrast, Examples 1 and 2 (Ex. 1 and Ex. 2) which were blends 20 wt % and 25 wt % respectively of a metallocene-catalyzed butene-propylene elastomer Tafmer® XM7070 show adequate heat seal properties at 115° C. seal temperature of 117 and 203 g/in, respectively. FIG. 1 also shows Examples 1 and 2 to have respective SIT of ca. 115° C. and 110° C. Matte appearance is maintained as well, with matte side gloss of both examples below 15 and haze above 60% at 64.3% and 60.4% respectively.

Comparative Example 2 (CEx. 2) Table 1 and FIG. 1 is a film that utilized 80 wt % matte resin PC523A blended with 20 wt % of a metallocene-catalyzed ethylene-octene elastomer EXACT™ 4150 as a heat sealable matte resin skin layer. This film did not have adequate matte appearance due to a high matte side gloss of over 15 (19.8) and haze being low at 39.7. Without being bound by any theory, it is thought that the ethylene-octene elastomer may have helped to compatibilize the polyethylene content with the propylene copolymer content of the matte resin and thus, helped reduce the incompatibility that produces a matte and hazy film. Moreover, CEx. 2 exhibited no heat sealability at 115° C. and had a higher SIT of ca. 127° C.

Comparative Example 3 (CEx. 3) utilized a higher amount of metallocene-catalyzed butene-propylene elastomer XM7070 at 40 wt % blended with the matte resin PC523A than used in Examples 1 and 2. Its heat sealability is excellent, achieving 274 g/in at 115° C. seal temperature, and its SIT is lowest at ca. 103° C. However, CEx. 3's matte appearance is poorer with a higher matte side gloss of 18.8 and lower haze at 37.1%. It is thought that the matte resin content was too diluted by the relatively higher amount of elastomer used to maintain adequate matte appearance.

Comparative Examples 4-6 (CEx. 4-6) used a higher molecular weight ternary copolymer of ethylene, butene, and propylene. Blends of EPB terpolymer Sumitomo SPX78H8 were blended with the matte resin PC523A at ratios of 70, 50, and 30 wt % respectively. Heat sealability of CEx. 4 and 5, where 70 wt % and 50 wt % terpolymer was used respectively, was good at 115° C. achieving 270 and 168 g/in seal strength respectively, and SIT of ca. 110° C. and 113° C. respectively. However, matte appearance of CEx. 4 and 5 were inadequate, with matte side gloss above 15 at 32.4 and 15.4 respectively, and haze much less than 60% at 21% and 49% respectively. Heat sealability of CEx. 6 which used 30 wt % of EPB terpolymer Sumitomo SPX78H8 was poorer, exhibiting only 74 g/in at 115° C. seal temperature and a higher SIT of ca. 116° C. or so. Matte appearance, however, was maintained adequately, with matte side gloss of 14.2 and haze of 66.8%.

Comparative Example 7 (CEx. 7), which used a blend of 75 wt % matte resin PC523A with 25 wt % of a non-metallocene-catalyzed (i.e. Ziegler-catalyzed) butene-propylene elastomer Tafmer™ XR110T of similar butene content to that of the metallocene-catalyzed butene-propylene elastomer XM7070, showed adequate matte appearance properties of 14.6 matte side gloss and 59.8% (ca. 60%) haze. However, heat sealability was poorer with 28 g/in heat seal strength at 115° C. and SIT of ca. 120° C.

Thus, of the foregoing Examples and Comparative Examples, only Examples 1-2, which used an amount of modifying metallocene butene-propylene elastomer blended with a matte resin base, was effective in satisfying all the requirements of high matte appearance (i.e. low gloss), high haze, and good heat seal properties. Surprisingly, only the metallocene-catalyzed butene-propylene elastomers were effective in providing an adequate balance of heat sealability and matte appearance; equivalent non-metallocene-catalyzed (Ziegler-catalyzed) butene-propylene elastomers or metallocene-catalyzed ethylene-propylene elastomers were not as effective at balancing these properties.

Test Methods

The various properties in the above examples were measured by the following methods:

Heat seal strength was measured by using a Sentinel sealer model 12 ASL at 20 psi, 0.5 second dwell time, with heated flat upper seal jaw Teflon coated, and unheated lower seal jaw, rubber with glass-cloth covered. The film sample is heat-sealed sealable-side to sealable-side at various desired seal temperatures in the Sentinel sealer (e.g. 240° F. or 115° C.) or at desired temperature increments (e.g. 10° F. or 5.56° C. increments) from 190° F. (65.56° C.) to 290° F. (143.3° C.) and then the respective seal strengths are measured using an Instron model 4201 tensile tester. The heat-sealed film samples are cut into 1-inch wide strips, the two unsealed tails placed in the upper and lower Instron clamps, and the sealed tail supported at a 90° angle to the two unsealed tails for a 90° T-peel test. The peak and average seal strength is recorded. The preferred peak value is minimum 100 g/in or more at 115° C. (240° F.) seal temperature.

Heat seal initiation temperature (SIT) was measured by using a Sentinel sealer model 12 ASL at 20 psi, 0.5 second dwell time, with heated flat upper seal jaw Teflon coated, and unheated lower seal jaw, rubber with glass-cloth covered. The film sample is heat-sealed sealable-side to sealable-side at various desired seal temperatures in the Sentinel sealer and then the respective seal strengths are measured using an Instron model 4201 tensile tester as discussed above for heat seal strength determination. The Seal Initiation Temperature is defined as the seal temperature at which the film demonstrated a minimum of 100 g/in heat seal strength. The preferred SIT value is maximum 115° C. (240° F.) or lower.

Transparency of the film was measured by measuring the haze of a single sheet of film using a hazemeter model like a BYK Gardner "HAZE-GARD PLUS®" substantially in accordance with ASTM D1003. Preferred values for haze was 60% minimum or higher.

Gloss was measured on a single sheet of film on the side of interest (e.g. matte layer side or non-matte side) using a surface reflectivity gloss meter like model BYK Gardner "MICRO-GLOSS®" at a 60° angle substantially in accordance with ASTM D2457. Preferred values for gloss on the matte layer side was less than 15.

Wetting tension of the surfaces of interest was measured substantially in accordance with ASTM D2578-67. In general, the preferred value was an average value equal to or more than 40 dyne/cm with a minimum of 38 dyne/cm.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A thermally stable laminate film comprising:
   a polyolefin base layer; and
   a heat sealable matte resin layer consisting of 15 to 30 wt % of a metallocene-catalyzed propylene-butene copolymer elastomer having a 20-40 wt % butene content ethylene propylene random copolymer, and low density polyethylene,
   wherein the film has at least a 60% haze measured in accordance with ASTM D1003.

2. The laminate film of claim 1, wherein the polyolefin base layer comprises a propylene homopolymer or propylene-ethylene copolymer.

3. The laminate film of claim 1, wherein the polyolefin base layer comprises an isotactic propylene homopolymer or mini-random ethylene-propylene compolymer.

4. The laminate film of claim 1, wherein the polyolefin base layer comprises an isotactic propylene homopolymer having a $C^{13}$ NMR isotactic pentad index of 95% or more.

5. The laminate film of claim 1, wherein the polyolefin base layer comprises an antiblock component selected from the group consisting of amorphous silicas, aluminosilicates, sodium calcium aluminum silicates, crosslinked silicone polymers, and polymethylmethacrylates.

6. The laminate film of claim 1, further comprising a metallized layer with an optical density of at least about 1.5.

7. The laminate film of claim 1, wherein the film has been heat-set at 151-173° C.

8. A thermally stable laminate film comprising:
   a polyolefin base layer;
   a heat sealable matte resin layer consisting of 15 to 30 wt % of a metallocene-catalyzed propylene-butene copolymer elastomer having a 20-40 wt % butene content, ethylene propylene random copolymer, and low density polyethylene; and
   a second polyolefin layer on a side of the polyolefin base layer opposite the heat sealable matte resin layer,
   wherein the film has at least a 60% haze measured in accordance with ASTM D1003.

9. The laminate film of claim 8, wherein the second polyolefin layer comprises polyolefin selected from the group consisting of propylene homopolymer, copolymers, terpolymers, polyethylene and combinations thereof.

10. The laminate film of claim 8, wherein the second polyolefin layer comprises an antiblock component selected from the group consisting of amorphous silicas, aluminosilicates, sodium calcium aluminum silicates, crosslinked silicone polymers, and polymethylmethacrylates.

11. The laminate film of claim 8, wherein the second polyolefin layer is a discharge-treated.

12. The laminate film of claim 8, further comprising a metallized layer with an optical density of at least about 1.5.

13. The laminate film of claim 8, wherein the film has been heat-set at 151-173° C.

14. A single layer thermally stable film comprising:
   a heat sealable matte resin layer consisting of 15 to 30 wt % of a metallocene-catalyzed propylene-butene copolymer elastomer having a 20-40 wt % butene content and 70 to 85% of a blend of ethylene propylene random copolymer and low density polyethylene,
   wherein the film has at least a 60% haze measured in accordance with ASTM D1003.

15. The single layer film of claim 14, wherein one side of the film is discharge treated and one side of the film is not discharge treated.

16. The single layer film of claim 14, wherein the film has been heat-set at 151-173° C.

* * * * *